United States Patent [19]

Ulrich et al.

[11] Patent Number: 5,714,731
[45] Date of Patent: Feb. 3, 1998

[54] WELDING POWER SUPPLY ARC STARTER

[75] Inventors: James Frank Ulrich, Hortonville;
Michael David Madsen, Clintonville;
Steven J. Geissler, Little Chute; Todd Gerald Batzler, Hortonville, all of Wis.

[73] Assignee: Illinois Tool Works Inc., Glenview, Ill.

[21] Appl. No.: 680,867

[22] Filed: Jul. 16, 1996

[51] Int. Cl.[6] .................................................. B23K 9/06
[52] U.S. Cl. .......................... 219/130.4; 219/137 PS
[58] Field of Search ........................ 219/130.4, 130.5, 219/130.1, 137 PS

[56] References Cited

U.S. PATENT DOCUMENTS

| | | | |
|---|---|---|---|
| 2,773,170 | 12/1956 | Barthel | 219/130.4 |
| 2,784,349 | 3/1957 | Anderson | 219/130.4 |
| 3,051,829 | 8/1962 | Manz | 219/130.4 |
| 3,154,721 | 10/1964 | Sommeria | 219/130.4 |
| 3,253,119 | 5/1966 | Manz | 219/130.4 |
| 3,284,609 | 11/1966 | Allen et al. | 219/130.4 |
| 3,299,249 | 1/1967 | Sciaky | 219/130.5 |
| 3,751,627 | 8/1973 | Prischi | 219/130.4 |

*Primary Examiner*—Clifford C. Shaw
*Attorney, Agent, or Firm*—George R. Corrigan

[57] ABSTRACT

A method and apparatus for arc welding, particularly starting an arc is disclosed. A welding power source that provides a welding current to an electrode and a workpiece includes a source of welding current having an inductor. The inductor and current source are connected to a pair of outputs, such as the output studs, and form a welding current path including the source of current, the output inductor, the outputs and the electrode and workpiece. A source of a high frequency voltage, such as a high frequency coupling coil is included in the welding current path. An arc starting circuit provides a controllable current path for current flow in the inductor prior to the application of high frequency voltage. The arc starting current path is not the welding current path.

26 Claims, 2 Drawing Sheets

WELDING POWER SUPPLY ARC STARTER

FIELD OF THE INVENTION

The present invention relates generally to welding and welding power supplies and, in particular, to a method and apparatus for starting the arc when welding.

BACKGROUND OF THE INVENTION

Arc welding is a well known process in which energy of an electric arc that is formed between an electrode and a welding workpiece is used to perform the welding process. There are many different types of arc welding processes including, for example, SMAW (stick metal arc welding) and GTAW (gas tungsten arc welding) also called TIG (tungsten inert gas) welding. Also, there are a variety of known welding power supplies, such as DC power supplies, AC power supplies and AC/DC power supplies. The arc welding process may entail the use of a consumable electrode (SMAW) or a non consumable electrode (GTAW).

One known type of DC welding power supply receives an AC line voltage and provides a DC current suitable for welding. The power supply may include a rectifier to receive the AC voltage and converter which converts the rectified voltage to produce a DC current. Other power supplies include a transformer and a rectifier. Generally, the output circuit of a DC power supply includes an inductor (also called a stabilizer or choke) which help maintains constant current regardless of the condition of the arc. The inductor has a sufficient inductance to maintain the weld current despite variation in the load (such as arc length). AC inverter-based power supplies may similarly include a rectifier, converter, inverter, and output inductor (located in the converter).

It is known in welding that it is easier to maintain an arc than to start the arc. This is, in part, because an arc (which is comprised of ionized gases) has less resistance than non-ionized gasses prior to the striking of the arc. Thus, a higher voltage is needed to start an arc than to maintain the arc.

It is well known to provide a high frequency overlay to assist in arc starting. Such an overlay consists of applying a high voltage, low current signal at a high frequency across the arc. The high frequency signal may be applied through a high frequency coupling coil which is in series with the welding arc and the power supply. The high frequency coupling coil may be part of the welding power supply, or an external coil applied to the output of the welding power supply. The high frequency overlay may be applied only upon start up, continuously, or as needed. Typically, when the high frequency is applied only upon start up, it is applied for a brief period of time. When the high frequency is applied it creates a high frequency glow discharge, which aids in the striking of the arc. The glow discharge is converted into an arc by applying a welding current at a low voltage (such as less than 100 volts), to the output of a welder through the output inductor.

The current in the inductor does not begin to flow until the high frequency is applied in known arc starters. However, the length of time it takes to build up current in the output inductor is often longer (due to the magnitude of the inductance) than the length of time the glow discharge or high frequency is available. Thus, starts may be unreliable because the welding current does not reach a value sufficient to maintain the arc until after the high frequency and glow discharge has been terminated.

Welding arc starters are often sold as add-ons. Such welding arc starters are connected to the output studs of a welding power supply and in turn provide their own output studs which are connected to the welding cables. Such add-ons may be beneficial in that they allow retro-fitting of existing welding power supplies and do not require the purchase of the arc starting unless it is needed. Alternatively, it may be desirable to include an arc starter as an internal part of a power supply so as to minimize complexity and inconvenience.

Thus, it is desirable to provide high frequency starter which will provide suitable current for initiating the arc prior to the termination of the high frequency current or glow discharge. Additionally, such a system should be relatively simple and inexpensive to manufacture. Moreover, it is desirable to have such a system be capable of being used as an internal part of the power supply, or as an external part which may be attached to the welding output studs.

SUMMARY OF THE PRESENT INVENTION

The present invention is a welding power source that provides a welding current to an electrode and a workpiece and has an arc starting circuit. The power supply includes a source of welding current having an inductor. The inductor and current source are connected to a pair of outputs, such as the output studs. A welding current path including the source of current, the output inductor, the outputs and the electrode and workpiece is thus formed. A source of a starting voltage, such as a high frequency coupling coil is also provided in the welding current path. An arc starting circuit provides a controllable current path for current flow in the inductor, wherein the controllable current path is not the welding current path.

According to one alternative, the arc starting circuit is connected across the source of DC current and the inductor, and includes a switch. A controller for turning the switch on prior to the initiation of welding current is also provided. The switch may be a transistor, or other type of switch. According to another alternative, the arc starting circuit includes a current limiting element, such as a resistor.

According to another embodiment, the arc starting circuit includes an arc starting inductor that shares the magnetic core of the output inductor. The arc starting inductor and the output inductor are formed by multiple taps of a single inductor, in one alternative.

In one arrangement the arc starting circuit is connected outside the power supply and across the output studs, and includes its own pair of output studs. The arc starter studs are capable of being connected to the electrode and the workpiece. In an alternative embodiment the arc starting circuit is disposed inside the welding power supply and connected across the output studs. In other alternatives the power source is either an AC, a DC, or an AC/DC power source.

A second aspect of the invention is a method of arc welding including the steps of providing current through an inductance to an electrode and a workpiece, thereby forming a welding current path. A starting voltage is applied to the welding current path when it is desired to initiate the arc and an arc starting current path including the inductance is provided prior to the initiation of the starting voltage.

A third aspect of the invention is a welding arc starter for use with a welding power supply that has an output inductor and a welding current path. The arc starter includes a high frequency voltage source in the welding current path and an arc starting circuit. The arc starting circuit is connected to the output inductor and provides a controllable current path for current flow in the inductor other than the welding current path.

A fourth aspect of the invention is a method of starting a welding arc including the steps of providing a high frequency voltage in a welding current path when it is desired to initiate the arc and providing an arc starting current path including the inductance prior to the initiation of the high frequency voltage.

Before explaining at least one embodiment of the invention in detail, it is to be understood the invention is not limited in its application to the details of construction and the arrangement of the components set forth in the following description or illustrated in the figures. The invention is capable of other embodiments are being practiced or carried out in various ways. Also it is to be understood the phraseology and terminology employed herein is for the purposes of description and should not be regarded as limiting.

DETAILED DESCRIPTION OF THE PREFERRED EMBODIMENTS

The present invention is directed primarily to an arc starter for use in a welding power supply. The preferred embodiment will be described for use in a DC welding power supply, and an alternative embodiment will be described for use in an AC welding power supply. However, it should be readily apparent that the alternatives shown are not necessarily limited to the configuration(s) with which they are shown.

Figure 1:
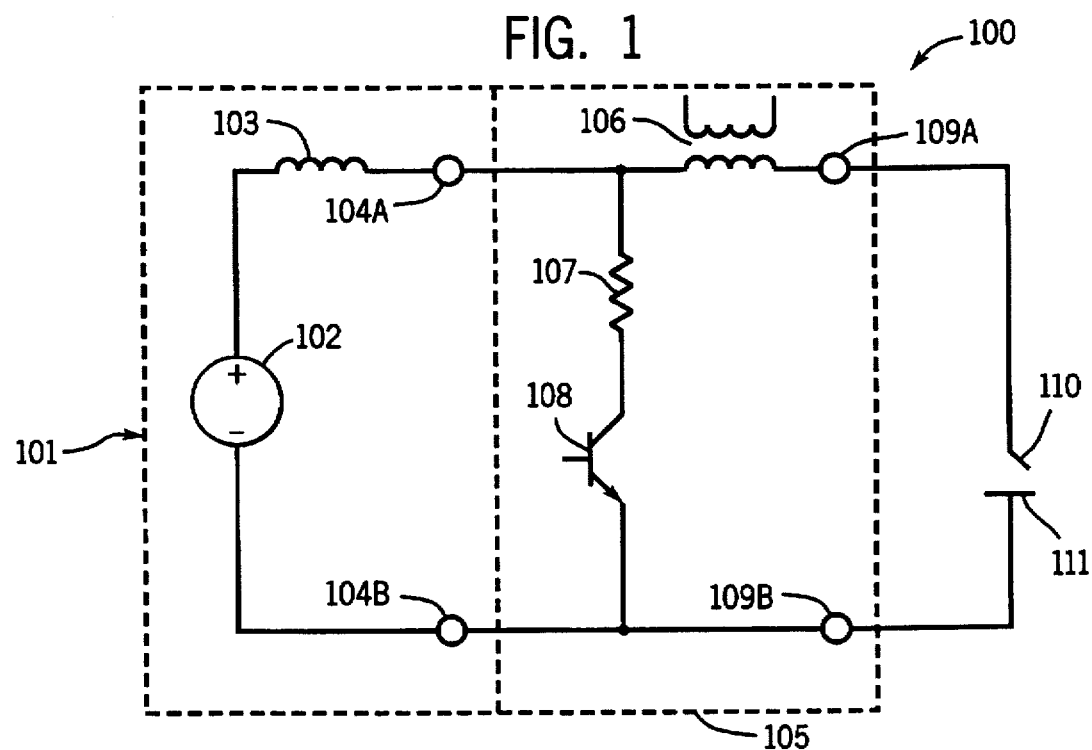
FIG. 1 is a schematic diagram of a DC welding power supply including an external arc starter in accordance with the present invention.

Referring now to FIG. 1, a welder 100, provides welding current to an electrode 110 for welding a workpiece 111. Welding power supply 101 is a typical DC welding power supply, such as one that includes a source of DC voltage 102 and an output inductor 103. Output inductor 103 may also be called a stabilizer or choke, and as used herein an output inductor is an inductor that tends to maintain the welding current at a desired magnitude. The output of DC welding power supply 101 is provided on output studs 104a and 104b. Conventional DC welding power supplies not using the present invention would have electrode 110 connected directly to output stud 104a and work piece 111 connected directly to output stud 104b.

According to the present invention, however, arc starter 105 is connected to output studs 104a and 104b. Arc starter 105 includes output studs 109a and 109b. Electrode 110 is then connected to output stud 109a and workpiece 111 is connected to output stud 109b. Arc starter 105 also includes a typical high frequency coupling coil 106, a transistor 108 and a resister 107. Prior art DC welding power supplies have included an arc starter comprised of a high frequency coupling coil, such as coil 106, connected in series between an output inductor, such as inductor 103, and an electrode.

The inventive arc starter disclosed herein provides for current flowing through inductor 103 prior to the initiation of high frequency voltage by high frequency coil 106. Specifically, prior to the initiation of high frequency voltage, transistor 108 is turned on by a control circuit (not shown). The specific design of the control circuit is not important, and it may be a separate control circuit, part of a high frequency control circuit, or part of the control board of welding power supply 101. Transistor 108 may be any switch such as, for example, an SCR, transistor IGBT, or a relay. When switch 108 is turned on current flows from DC voltage source 102 through inductor 103 and current limiting resistor 107. This allows current in inductor 103 to build up (possibly saturating the core of inductor 103). Thus, when the high frequency voltage is applied through coil 106 creating a glow discharge, the current in inductor 103 is high and current sufficient to start and maintain an arc may quickly be provided.

Resistor 107 is provided (in one embodiment) to limit the current which is used to saturate the core of inductor 103. When the current is established through the arc, then transistor 108 is turned off. Alternatively, transistor 108 may be turned off when the glow discharge begins. Thus, if the arc has not been established, inductor 103 will cause a high voltage, which supplements the high voltage created by high frequency coil 106, to help start the arc. In one embodiment the high voltage from inductor 103 is itself sufficient to start the arc.

Thus, it may be seen that simple yet elegant circuit comprised of a switch in a current limiting device will allow the arc to be started in a stable and consistent manner. Alternative arrangements may be used, such as using different types of switches for transistor 108 and or different types of current limiting devices for resistor 107, or omitting resistor 107 altogether. In another alternative the current is limited by controlling the power source. Another alternative is to place arc starting circuit 105 across inductor 103, and not across voltage source 102. A current source is then provided as part of arc starting circuit 105, to help saturate inductor 103. Also, a source of high voltage other than high frequency coupling coil 106 may be used. Alternatively, coupling coil 106 may be combined (magnetically or electrically) with inductor 103.

The embodiment of FIG. 1 as shown connects to the output studs of the welder and is thus an external arc starter. Such an arc starter may be sold separately from (or as part of) welding power supply 101. Since arc starter 105 is connected to the output studs of power supply 101 it may be easily retro-fitted to existing power supplies.

Figure 2:
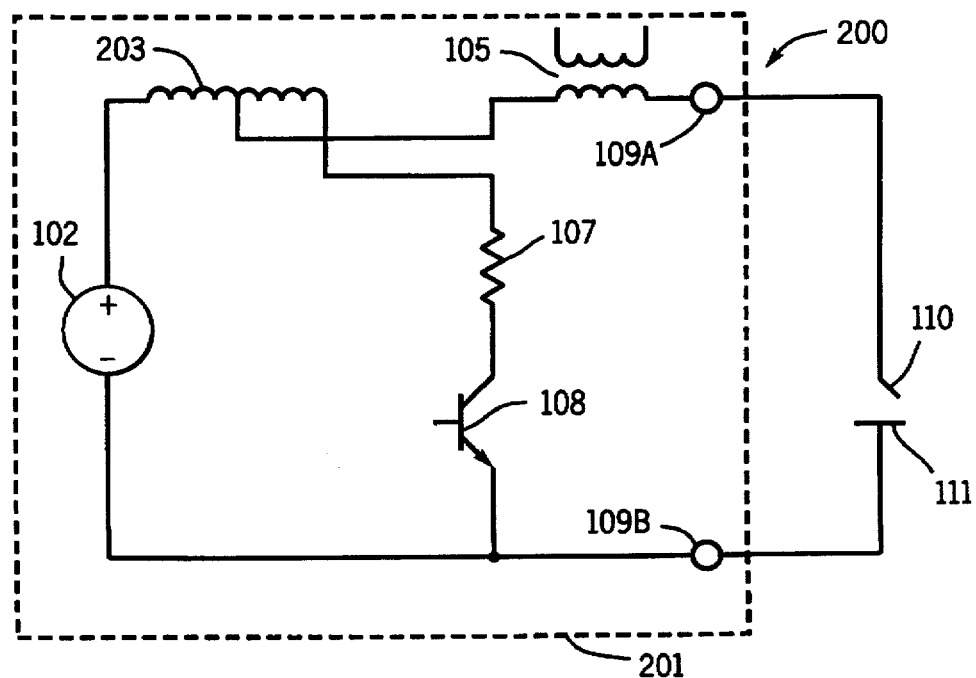
FIG. 2 is a schematic diagram of a DC welding power supply including an internal (or integral) arc starter made in accordance with one embodiment of the present invention.

FIG. 2 shows an alternative embodiment of the inventive arc starter, which is also used on a DC power supply. Arc welder 200 includes a power supply 201 having output studs 104a and 104b, which are connected to electrode 110 and workpiece 111, respectively. Arc welder 200 includes a DC voltage source 102 and an output inductor 203. A transistor 108 is connected through a current limiting resistor 107 and inductor 203. Inductor 203 differs inductor 103 (of FIG. 1) in that inductor 203 includes multiple taps. A first tap is provided for the welding current output and a second tap is provided for the arc starter comprised of resistor 107 and switch 108. The tap for the welding current includes a typical number of turns, whereas the tap for the arc starter includes a greater number of turns. Thus, the core of inductor 203 may be saturated using a smaller current through resistor 107 and transistor 108.

Operation of the arc starter of FIG. 2 is similar to that of FIG. 1. Prior to initiation of the high frequency voltage, transistor 108 is turned on. Current flows through inductor 203, resistor 107, and switch 108. Thus, when the high frequency voltage is initiated and the glow discharge begins current is readily available to flow through electrode 110 and workpiece 111. Accordingly, arc starting may be accomplished consistently and in a stable manner. One advantage of the embodiment of FIG. 2 is that a smaller current is needed to start the arc. Thus, it may be more efficient than other embodiments. Also, current limiting resistor 107 is less useful in this embodiment.

The embodiment of FIG. 2 is an internal arc starter, wherein the arc starter is internal to the welding machine. Thus, the controls for resistor 108 may be conveniently located on the control board for welder 200.

Figure 3:
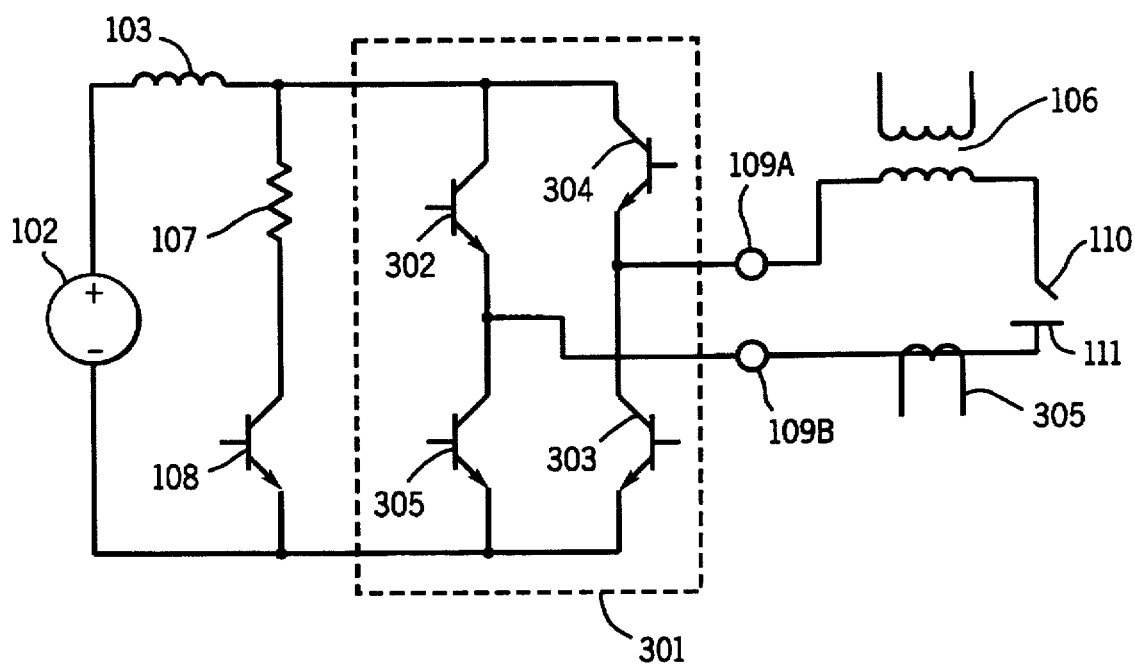
FIG. 3 is a schematic diagram of an AC welding power supply having an internal arc starter in accordance with one embodiment of the present invention.

Another alternative embodiment is to use the arc starter of the present invention with an AC inverter-based welding power supply, such as that shown in FIG. 3. AC welding power supply shown in FIG. 3 includes a DC voltage source 102 and inductor 103 and an inverter 301. Invertor 301 is a h-bridge comprised of switches 302, 303, 304, and 305. Output of the h bridge is provided to output studs 104a and 104b. Electrode 110 is connected to output stud 104a, through a high frequency coil 106. Workpiece 111 is connected to output stud 104b. Current transformer 305, which may be used to monitor the output current is also shown.

Generally speaking, DC voltage source 102 and inductor 103 operate to provide a DC current. Invertor 301 switches the DC current across the output studs of the machine, thus providing an AC current output. An arc starter in accordance with the present invention includes transistor 108 and a resistor 107. These components are provided across the DC voltage source and inductor 103. Thus, prior to initializing the high frequency voltage through high frequency coil 106 transistor 108 is turned on. As described above, current flows through inductor 103, and when high frequency voltage is applied, current may be readily provided to the arc.

Additionally, in this embodiment a current transformer 305 is used to obtain a signal indicative of the welding current. Because turning transistor 108 off abruptly and prior to the flowing of current through the arc may, depending upon components sizes etc., cause an unsafe voltage to appear between the electrode and the workpiece, transformer 305 is used to sense when welding current had been initiated. Specifically, a signal greater than a given threshold is taken as an indication that the welding current has been initiated. A signal less than the threshold indicates the welding current has not been initiated. The control circuit for transistor 108 may thus maintain transistor 108 on until the welding current has exceeded the threshold.

Other modifications may be made in the design and arrangement of the elements discussed herein without departing from the spirit and scope of the invention as expressed in the appended claims.

The embodiments of the invention in which an exclusive property or privilege is claimed are defined as follows:

1. A welding power source for providing a welding current to an electrode and a workpiece comprising:

a source of welding current, including an output inductor;

a pair of outputs in electrical communication with the source of welding current, wherein the outputs are capable of being connected to the electrode and the workpiece to form a welding current path including the source of current, the output inductor, the outputs and the electrode and workpiece;

an arc stabilizing circuit, connected across the source of welding current and the output inductor, that includes a switch, wherein the arc stabilizing circuit provides a controllable current path, other than the welding current path, for current flow in the inductor;

a high frequency coupling coil disposed in the welding current circuit, and a controller, wherein the switch is turned on prior to the initiation of welding current.

2. The welding power source of claim 1, wherein the switch is a transistor.

3. The welding power source of claim 1, wherein the arc stabilizing circuit includes a current limiting element.

4. The welding power source of claim 3, wherein the current limiting element is a resistor.

5. The welding power source of claim 1, wherein the output inductor has a magnetic core, and the arc stabilizing circuit includes an arc starting inductor, wherein the arc starting inductor shares the magnetic core.

6. The welding power source of claim 5, wherein the arc stabilizing inductor and the output inductor are part of a multiple tap inductor.

7. The welding power source of claim 1, wherein the outputs are output studs, and further wherein the arc stabilizing circuit includes a second pair of studs, wherein the second pair of studs are capable of being connected to the electrode and the workpiece.

8. The welding power source of claim 1, wherein the outputs are output studs, and the arc stabilizing circuit is disposed inside the welding power supply, and connected across the output studs.

9. The welding power source of claim 1, wherein welding power source is a DC power source.

10. The welding power source of claim 1, wherein welding power source is an AC power source.

11. The arc starter of claim 1, wherein the high frequency coupling coil is in series with a parallel arrangement of the outputs and the stabilizing circuit.

12. A method of arc welding comprising:

providing current through an inductance to a pair of outputs, and to an electrode and a workpiece to form a welding current path;

providing an arc stabilizing current path including the inductance prior to the initiation of the welding current;

providing a high frequency voltage in the welding current path when it is desired to initiate the arc; and causing current to flow through the inductance by closing a switch prior to the initiation of the high frequency voltage.

13. The method of claim 12, wherein the step of providing current includes the step of providing a DC current.

14. The method of claim 12, wherein the step of providing current includes the step of inverting a DC current to provide an AC current.

15. The method of claim 12 wherein the step of providing a high frequency voltage includes the step of applying the voltage to the electrode and the workpiece and not applying it to the switch.

16. A welding power source for providing a welding current to an electrode and a workpiece comprising:

a source of welding current, including an output inductor;

a pair of outputs in electrical communication with the source of welding current, wherein the outputs are capable of being connected to the electrode and the workpiece to form a welding current path including the source of current, the output inductor, the outputs and the electrode and workpiece;

an arc stabilizing circuit means, in electrical communication with the output inductor, for causing current to flow in the inductor prior to the initiation of the arc; and a high frequency coupling coil, disposed in the welding current circuit.

17. The welding power source of claim 16, wherein the arc stabilizing circuit includes a current limiting means.

18. A welding arc starter for use with a welding power supply having an output inductor and a welding current path, comprising an arc starting circuit in electrical communication with the output inductor, wherein the arc starting circuit provides a controllable current path for current flow in the inductor other than the welding current path;

wherein the arc starting circuit includes a starting voltage source in the welding current path, and a switch in an arc stabilizing circuit connected to the starting circuit, and wherein the switch is turned on prior to the initiation of welding current; and wherein the starting source voltage is a high frequency coupling coil and the arc starting circuit is connected across a pair of output studs on the welding power supply, and further wherein the arc starting circuit includes a second pair of studs, wherein the second pair of studs are capable of being connected to the electrode and the workpiece.

19. The arc starter of claim 18, wherein the switch is a transistor.

20. The arc starter of claim 18, wherein the arc stabilizing circuit includes a current limiting element.

21. The arc starter of claim 18, wherein the output inductor has a magnetic core, and the arc starting circuit includes an arc starting inductor sharing the magnetic core.

22. The arc starter of claim 21, wherein the arc starting inductor and the output inductor are formed by multiple taps of a single inductor.

23. The arc starter of claim 18, wherein the arc starting circuit is disposed inside the welding power supply.

24. The arc starter of claim 18, wherein welding power source is a DC power source.

25. The arc starter of claim 18, wherein welding power source is an AC power source.

26. The arc starter of claim 18, wherein the high frequency coupling coil is in series with the parallel arrangement of the output studs and the starting circuit.

\* \* \* \* \*